US008238359B2

(12) United States Patent
Sunaga et al.

(10) Patent No.: US 8,238,359 B2
(45) Date of Patent: Aug. 7, 2012

(54) COMMUNICATION MODULE AND COMMUNICATION APPARATUS

(75) Inventors: Yoshinori Sunaga, Hitachinaka (JP); Akihiro Hiruta, Hitachi (JP)

(73) Assignee: Hitachi Cable, Ltd., Tokyo (JP)

(*) Notice: Subject to any disclaimer, the term of this patent is extended or adjusted under 35 U.S.C. 154(b) by 0 days.

(21) Appl. No.: 13/323,254

(22) Filed: Dec. 12, 2011

(65) Prior Publication Data
US 2012/0082168 A1   Apr. 5, 2012

Related U.S. Application Data

(62) Division of application No. 11/812,188, filed on Jun. 15, 2007, now Pat. No. 8,121,139.

(30) Foreign Application Priority Data

Sep. 8, 2006 (JP) ................. 2006-244161

(51) Int. Cl.
H04L 12/28 (2006.01)

(52) U.S. Cl. .......... 370/419; 370/423; 257/734; 385/14; 385/88

(58) Field of Classification Search ............... 370/423; 385/24, 88, 14; 398/164; 359/341.42
See application file for complete search history.

(56) References Cited

U.S. PATENT DOCUMENTS

| 4,870,637 A * | 9/1989 | Follett et al. ............... 398/52 |
| 5,636,047 A * | 6/1997 | Lagoutte et al. ............ 398/164 |
| 6,021,234 A | 2/2000 | Van Deventer |
| 6,616,344 B1 | 9/2003 | Van Deventer |
| 7,090,509 B1 | 8/2006 | Gilliland et al. |
| 2004/0065901 A1 | 4/2004 | Iwata et al. |
| 2004/0126053 A1 | 7/2004 | Ouchi |
| 2006/0067705 A1 | 3/2006 | Paulsen |
| 2007/0041085 A1 | 2/2007 | Nakano et al. |

FOREIGN PATENT DOCUMENTS

| JP | 2003-502691 A | 1/2003 |
| JP | 2004-104706 A | 4/2004 |
| JP | 2004-112775 A | 4/2004 |

* cited by examiner

*Primary Examiner* — Ayaz Sheikh
*Assistant Examiner* — Mounir Moutaouakil
(74) *Attorney, Agent, or Firm* — McGinn IP Law Group, PLLC

(57) ABSTRACT

A communication module mounted on a communication apparatus includes a communication apparatus main body including a plurality of slots, and being insertable into or removable from the slots, a plurality of apparatus side signal processing circuits for processing a communication signal which is transmitted to or received from the communication module, and a switch LSI for changing a destination of the communication signal. The communication module includes a switching portion for performing dividing the communication signal transmitted or received at a communication speed of the communication module, and combining the communication signals transmitted or received at a communication speed of an external apparatus, a connector including a plurality of input-output ports, each of the plurality of the input-output ports being connected to the external apparatus respectively, and a plurality of connecting terminals being connected to the communication apparatus main body when the communication module is inserted into the slots.

9 Claims, 5 Drawing Sheets

US 8,238,359 B2

COMMUNICATION MODULE AND COMMUNICATION APPARATUS

The present application is a Divisional Application of U.S. patent application Ser. No. 11/812,188, filed on Jun. 15, 2007, now U.S. Pat. No. 8,121,139 which is based on and claims priority from Japanese Patent Application No. 2006-244161 filed on Sep. 8, 2006, the entire contents of which are incorporated herein by reference.

BACKGROUND OF THE INVENTION

1. Field of the Invention

This invention relates to a communication module and a communication apparatus, and specifically, the communication module is used in the communication connected by plural rated communication modules, and transmits and receives with the rated communication modules and plural external apparatuses.

2. Description of the Related Art

A communication apparatus such as an Ethernet switch (hereinafter, an "etherswitch") includes an LSI for packet switching, a controller and software therefor, and a communication interface. A part of the interface of the etherswitch, which depends on a physical characteristic of a communication path (e.g., using an optical signal, using an electric signal), is formed by the rated communication module which is modularized, and may be selected according to needs such as a transmission distance.

In recent years, especially in a field of an optical communication, a pluggable module which can be easily put on and taken off the apparatus is commonly used so as to select the transmission distance and a transmission media even after the communication apparatus is set in a base station or a building. The pluggable module is defined as an industry standard called MSA (Multi Source Agreement), and by complying with the standard, the communication module of a supplier having many users can be used freely.

A conventional common communication apparatus includes a plurality of apparatus side signal processing circuits for processing a communication signal which is transmitted to and received from a plurality of the rated communication modules (e.g., rated optical transceiver) with a predetermined communication speed which is connected to the communication apparatus, and a switch LSI for switching these apparatus side signal processing circuits.

The related arts of the invention are, for example, JP-A-2003-502691, JA-A-2004-104706, and JP-A-2004-112775.

However, since the conventional communication apparatus basically has one communication module for one port (e.g., a one-to-one correspondence), a port density cannot be increased. Since the number of communication ports is increasing dramatically with an increasing scale of a network, if the communication port density does not increase, many costs, such as an apparatus and a setting place increase. However, it is difficult to solve that. Although there is a communication module integrating a plurality of the communication modules, the communication module will be a special module not based on the standard, and further, the port density does not become very high.

Moreover, in the conventional communication, the communication speed cannot be changed by changing the communication module.

For example, when there is a user necessary three 10-Gbit/s ports and ten 1-Gbit/s ports, as shown in FIG. 5, one 10-Gbit/s communication apparatus 51A and one 1-Gbit/s communication apparatus 51B are prepared. Then, a 10-Gbit/s communication module 53A having a communication port 52 of 10-Gbit/s is connected to the 10-Gbit/s communication apparatus 51A, the communication module 53A, and a communication module 53B connected to the communication apparatus 51B are connected by an optical fiber 54, and network 50 is formed.

Therefore, not only two types of two communication apparatuses 51A and 51B (i.e., 10-Gbit/s and 1-Gbit/s) are necessary, but the expensive communication port 52 of 10-Gbit/s is necessary for connecting the two adjacent communication apparatuses 51A and 51B other than for interfacing to an external apparatus despite a short-distance transmission.

Therefore, prior to the present invention, there has been no conventional system which can provide a communication module and a communication apparatus which can reduce the type and the number of communication apparatuses necessary for forming a network, and can reduce the number of futile (unused) high-speed and short-distance ports.

SUMMARY OF THE INVENTION

In view of the foregoing and other exemplary problems, drawbacks, and disadvantages of the conventional methods and structures, an exemplary feature of the present invention is to provide a communication module and a communication apparatus which can reduce the type and the number of communication apparatuses necessary for forming a network.

According to one exemplary aspect of the invention, a communication module mounted on a communication apparatus, the communication apparatus including:

a plurality of communication modules;

a plurality of apparatus side signal processing circuits for processing a communication signal which is transmitted to and received from the communication modules by a predetermined communication speed; and a switch LSI for changing a destination of the communication signal;

the communication module including:

a switching portion for at least one of dividing the communication signal transmitted and received in a communication speed of the communication modules and combining the communication signals transmitted and received in a communication speed of an external apparatus; and a connector comprising a plurality of ports, the connector being connected to the switching portion.

According to another exemplary aspect of the invention, a communication apparatus, includes:

a plurality of communication modules;

a plurality of apparatus side signal processing circuits for processing a communication signal which is transmitted to and received from the communication modules by a predetermined communication speed;

a switch LSI for changing a destination of the communication signal; and a communication module which is mounted on the communication apparatus, wherein the communication module comprises a switching portion for at least one of dividing the communication signal transmitted and received in a communication speed of the communication modules and combining the communication signals transmitted and received in a communication speed of an external apparatus and a connector comprising a plurality of ports, the connector being connected to the switching portion.

According to the present invention, a communication module and a communication apparatus which can reduce the type and the number of communication apparatuses necessary for forming a network, and can reduce the number of futile (unused) high-speed and short-distance ports, can be provided.

The above exemplary modifications may be made alone or in any combination thereof.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF THE EXEMPLARY EMBODIMENTS

Figure 1:
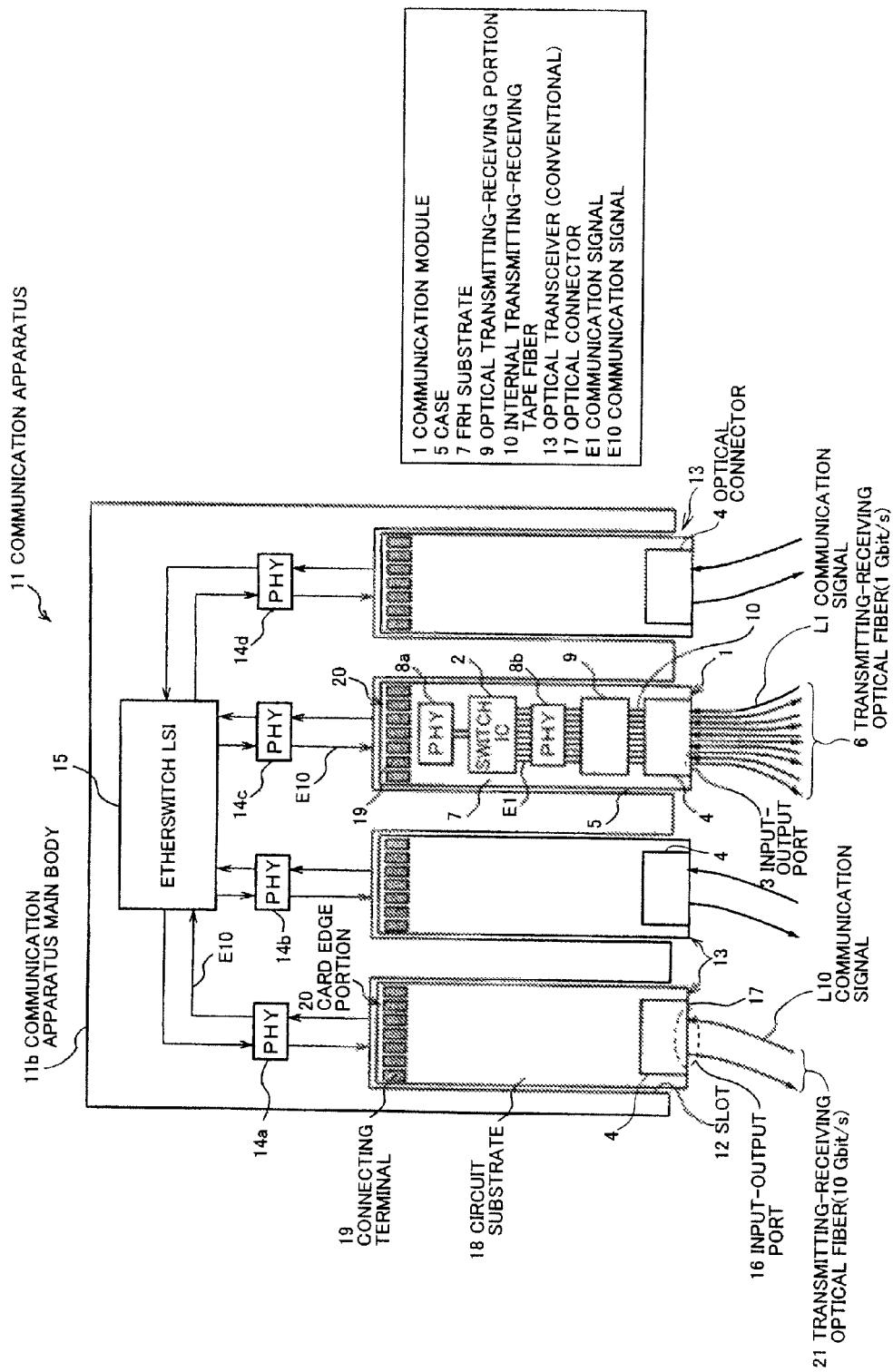
FIG. 1 is a block diagram showing a communication apparatus 11 including a communication module 1 with a packet switching function in an exemplary embodiment according to the present invention.

Referring now to the drawings, and more particularly to FIGS. 1-5, there are shown exemplary embodiments of the methods and structures according to the present invention.
Exemplary Embodiment An exemplary embodiment according to the present invention is described with reference to the accompanying drawings.

First of all, although there are various embodiments such as a switching hub and media converter as a communication apparatus using a communication module with a packet switching function according to the exemplary embodiment, hereinbelow, an exemplary etherswitch including an optical transceiver as a rated communication module is described.

FIG. 1 is a block diagram showing a communication apparatus 11 including the communication module 1 with a packet switching function in the exemplary embodiment according to the present invention.

As shown in FIG. 1, the communication apparatus 11 according to the exemplary embodiment includes a communication apparatus main body 11b, plural slots 12 formed in a user side, an optical transceiver (conventional transceiver) 13 as plural rated communication modules which are formed so as to be insertable into and removable from the slot 12 and connected to the communication apparatus main body 11b, plural PHYs (physical layer) 14a-14d as an apparatus side signal processing (signal conversion) circuit for processing a communication signal (e.g., a frame, a packet, data, or an information) which is transmitted to and received from the optical transceiver 13 in a predetermined communication speed, and an etherswitch LSI 15.

The slot 12 has a shape which enables the optical transceiver 13 to be insertable and removable. An outer shape of a case (package) of the optical transceiver 13 is formed by metal (e.g., Aluminum) performing good heat radiation and defined by an industry standard such as an X2 (a size of a business card except for thickness), XENPAK, and XFP.

The optical transceiver 13 includes an optical connector 17 including an input-output port 16 formed in an end of a user side, and a circuit substrate 18 which is connected to the optical connector 17 and on which an optical component and an electric component are mounted.

In an end of an apparatus side of the circuit substrate 18, a card edge portion 20 including plural connecting terminals 19 to be connected to the communication apparatus 11, is formed. In this exemplary embodiment, as the optical transceiver 13, the optical transceiver which has a communication speed (transmission speed) of about 10-Gbit/s is used. About the 10-Gbit/s optical transceiver, both the communication speed with the communication apparatus main body 11b and the communication speed with the external apparatus are about 10-Gbit/s.

In a back of the apparatus side of the slot 12, a card edge connector which is connected to the card edge portion 20 of the circuit substrate 18 and enables the optical transceiver 13 to be insertable and removable (pluggable), is formed. The optical transceiver 13 is inserted into the slot 12 and placed to the communication apparatus main body 11b. Thereby, a communication signal is transmitted and received between the optical transceiver 13 and another optical transceiver 13, or plural external apparatuses which are connected to the input-output port 16 of the optical transceiver 13. The external device is, for example, a terminal such as a PC, and another communication apparatus.

Each of the PHYs 14a-14d is connected between the etherswitch LSI 15 and each of the card edge connectors. The PHYs 14a-14d are signal processing circuits for converting (e.g., voltage conversion) the communication signal from the etherswitch 15 into a communication signal complying with the optical transceiver 13 operating in the physical layer of an OSI (Open System Interconnect) reference model, or the communication signal from the optical transceiver 13 into a communication signal complying with the etherswitch 15.

The etherswitch 15 changes paths (changes a destination of the communication signal) between each of the PHYs 14a-14d and each of the optical transceivers 13, or between each of the PHYs 14a-14d and the communication module 1.

The etherswitch 15 has a general function included in a conventional etherswitch. That is, when the communication signal is forwarded between the optical transceivers 13 or between each of the optical transceivers 13 and the communication module 1, the etherswitch 15 analyzes a destination MAC (Media Access Control) address of the communication signal, refers to an address table about the destination MAC address, and forwards the communication signal only to the input-output port 16 which is connected to the external apparatus having the destination MAC address. Thereby, the communication apparatus 11 works as a bridge including plural ports. In other words, the communication apparatus 11 can perform a one-on-one data forwarding between the external apparatuses at the same time.

The communication module 1 with a packet switching function in an exemplary includes a switch IC 2 as a switching portion, plural input-output ports 3 as optical communication ports, and an optical connector 4 as a connector connected to the switch IC 2.

With respect to the communication module 1, an outer shape of a case formed by metal (e.g., Aluminum) performing good heat radiation is defined by the industry standard such as X2, XENPAK, and XFP.

The switch IC 2 has switching functions (in this exemplary embodiment, a function for switching a data packet) including the following three functions.

i) A function dividing the communication signal transmitted and received in the communication speed of the optical transceiver 13 to plural communication signals.

ii) A function combining communication signals which are transmitted and received in communication speed of each external apparatus.

iii) A function forwarding the communication signal transmitted between the external apparatuses connected to the communication module 1, not via the etherswitch 15.

Needless to say, the switch IC 2 also has the same functions of the etherswitch 15 such relaying the communication signal, storing an address of the received communication signal to a filtering data base (FDB) as an address learning information, and a filtering function for deciding a forwarding port based on the address learning information, which have been known.

Further, the switch IC 2 includes a controller such as a microcomputer for controlling the switch IC 2. The controller has a function acquiring a management information such as an operation condition or a failure of the communication module 1. A similar controller can be formed in the communication apparatus main body 11b and be connected to the etherswitch LSI 15.

When one input channel and one output channel are defined as one pair, the input-output ports 3 have 5~12 pairs, that is, the total number of the input-output ports 3 is 10~24. In this exemplary embodiment, the input-output ports 3 have 12 input channels and 12 output channels, and the total number of the input-output ports 3 is 24.

As the optical connector 4, a parallel optical connector based on a MT (Mechanically Transferable) optical connector typified by a MPO (Multi-fiber Push-On) optical connector which can collectively connect plural transmitting and receiving optical fibers 6 (in this exemplary embodiment, 12 transmitting optical fibers and 12 receiving optical fibers) as a communication path.

The communication module 1 includes a flexible rigid hybrid (FRH) substrate 7 as a circuit substrate which is connected to the optical connector 4 and mounts the optical component and the electric component.

In an apparatus end of the FRH substrate 7, the card edge portion 20 including plural connecting terminals 19 to be connected to the communication apparatus 11 is formed. In this exemplary embodiment, the communication module 1 including the communication speed of about 10-Gbit/s with the communication apparatus main body 11b and an interface speed of about 1-Gbit/s with the external apparatus. "About 10-Gbit/s" and "about 1-Gbit/s" mean that an actual communication rate through a signal path (e.g., the FRH substrate 7, the transmitting and receiving optical fiber 6) may be somewhat different (e.g., 10.125 Gbit/s, 1.025 Gbit/s) therefrom.

The FRH substrate 7 mounts the switch IC 2, module side PHYs 8a and 8b, and an optical transmitting-receiving portion 9. The PHY 8a is connected between the switch IC 2 and the optical transmitting-receiving portion 9, the PHY 8b is connected between the switch IC 2 and the connecting terminal 19.

The PHY 8a converts (e.g., voltage conversion) the communication signal from the switch IC 2 into the communication signal complying with the optical transmitting-receiving portion 9 operating in the physical layer, or the communication signal from the optical transmitting-receiving portion 9 into the communication signal complying with the switch IC 2. The PHY 8b includes the same function as PHY 8a.

In the Ethernet system, a PHY chip basically has a function (i.e., a code converting function or a signal converting function) to convert a code used for switching an information and a code (physical layer) used for transmitting an information. For example, since in the 10G etherswitch apparatus, a signal for transmission, which is called "XAUI" (X (10) gigabit Attachment Unit Interface), is used for exchanging the signal with the 10 G communication module, the PHY chip (one or both of the PHYs 8a and 8b) becomes is necessary.

However, recently, many switch chips (switch IC 2) incorporate the above-mentioned functions of the PHY therein, and in this case, the PHY chip is not necessary. When the switch chip is mounted in the communication module, the PHY chip is used, if necessary, according to the input-output interface of the switch.

Additionally, since the PHY chip has a function useful for monitoring the communication and a function for correcting a degradation of the communication waveform (e.g., the degradation arises from wiring of lines on the circuit substrate or connecting of the connector), the PHY chip may be used for this purpose. Thus, there are some PHYs which do not perform the code conversion such as XAUI-on-XAUI.

In this exemplary embodiment, assuming that the switch chip does not have the code conversion function (the function of the PHY chip), the communication module 1 including the switch IC 2 and the PHYs 8a and 8b which are formed separately is described.

In this exemplary embodiment, although the switch IC 2 and the PHYs 8a and 8b are prepared separately, according to a system design of the communication module 1, the switch IC 2 having the functions of one or both of the PHYs 8a and Sb can be used. In this case, one or both of the PHYs 8a and Sb become unnecessary The optical transmitting-receiving portion 9 has a photo-electric conversion function and is connected to the optical connector 4 through an internal transmitting-receiving taped fiber 10.

Next, an operation of the communication module 1 is described with an operation of communication apparatus 11. In a following description, a PHY 14 is defined as a set of the PHYs 14a-14d.

The optical module 1 and each optical transceiver 13 are placed on an appropriate part of the slot 12 of the communication apparatus 11. When the external apparatus is connected to the optical connector 4 through the internal transmitting-receiving taped fiber 10 or connected to the optical connector 17 through a transmitting-receiving optical fiber 21, only the communication module 1, or the communication module 1, each optical transceiver 13, and the communication apparatus 11, or each optical transceiver 13, and the communication apparatus 11 operate.

i) Between the optical transceiver 13 and the communication module 1:

A communication signal L10 of 10-Gbit/s received from the external apparatus connected to the optical transceiver 13 is converted into the electric signal and changed to a communication signal E10 by the optical transceiver 13, and the communication signal E10 is received by the etherswitch LSI 15 through the PHY 14 (e.g., the PHY 14a).

The etherswitch LSI 15 judges the destination MAC address of the received communication signal E10. If the destination MAC address is of the external apparatus connected to the communication module 1, then the etherswitch LSI 15 switches to a path connected to the communication module 1 and forwards the communication signal E10 to the communication module 1 through the PHY 14c.

If the destination MAC address is of the external apparatus connected to another optical transceiver 13, then the etherswitch LSI 15 switches the paths to a transmitting-receiving path (the transmitting-receiving path connected to other than the PHY 14c) connected to the another optical transceiver 13.

If the destination MAC address is not in the address table, then the etherswitch LSI 15 discards the communication signal E10.

The switch IC 2 of the communication module 1 refers (judges) the destination MAC address of the communication signal E10 forwarded by the etherswitch LSI 15. If the destination MAC address is of the external apparatus connected to the communication module 1, then the switch IC 2 divides the communication signal E10 forwarded by the etherswitch LSI 15 into plural communication signals E1 by time division or frequency division, changes transmitting paths of the FRH substrates 7, and transmits them to the PHY 8a.

The divided communication signal E1 is 1-Gbit/s, converted into the optical signal and changed to a communication signal L1 by the optical transmitting-receiving portion 9. The communication signal L1 is transmitted from the input-output port 3 of the optical connector 4, through the internal transmitting-receiving taped fiber 10. If the destination MAC address is not in the address table, then the switch IC 2 discards the communication signal E10.

2) Between the communication module 1 and the optical transceiver 13:

The communication signal L1 of 1 Gbit/s received from the external apparatus connected to the communication module 1 is converted into the electric signal and changed to a communication signal E1 by the optical transmitting-receiving portion 9, and the communication signal E1 is received by the switch IC 2 through a receiving lane (path) of the FRH substrate 7 and the PHY 8a. In this case, one communication signal received from one external apparatus or plural communication signals received from plural external apparatuses can be used as the received communication signal E1.

The switch IC 2 judges the destination MAC address of the received communication signal E1, if the destination MAC address is of the external apparatus connected to the optical transceiver 13, then the switch IC 2 transmits the communication signal E1 to the etherswitch LSI 15 through the PHY 14c. If the destination MAC address is not in the address table, then the switch IC 2 discards the communication signal E1.

In this case, if the received communication signal E1 is a single signal, the switch IC 2 transmits the communication signal E1 to the etherswitch LSI 15. If the received communication signal E1 is multiple signals, then the switch IC 2 combines the signals by time division multiplex or frequency division multiplex, and transmits the combined signal to the etherswitch LSI 15 as the 10-Gbit/s communication signal E10.

The etherswitch LSI 15, in the same manner as above, judges the destination MAC address of the received communication signal E10, and forwards the received communication signal E10 to the optical transceiver 13 which is connected to the external apparatus having the destination MAC address. Then, the communication signal E10 received by the optical transceiver 13 is converted into the optical signal by the optical transceiver 13 and changed to the communication signal L10, and the communication signal L10 is transmitted and received by the external apparatus.

iii) Between the external apparatuses connected to the communication module 1 (single communication module 1):

The 1 Gbit/s communication signal L1 which is received from the external apparatus connected to the communication module 1 is converted into an electric signal by the optical transmitting-receiving portion 9 and changed to the communication signal E1. The communication signal E1 is received by the switch IC 2 through the receiving lane of the FRH substrate 7 and the PHY 8a.

The switch IC 2 judges the destination MAC address of the received communication signal E1. If the destination MAC address is of another external apparatus connected to the communication module 1, then the switch IC 2 does not forward the communication signal E1 to the etherswitch LSI 15, but instead switches the transmitting paths of the FRH substrate 7, and transmits the communication signal E1 to the PHY 8a.

Then, the communication signal E1 is converted into the optical signal by the optical transmitting-receiving portion 9 and changed to the communication signal L1. The communication signal L1 is transmitted from the input-output port 3 of the optical connector 4, and received by the external apparatus through the transmitting-receiving optical fiber 6. If the destination MAC address is not in the address table, then the switch IC 2 discards the communication signal E1.

An operation of this exemplary embodiment will be described.

The communication module 1 includes the switch IC 2 having the packet switching functions described above in i) to iii), and also functions as an optical transceiver having conventional optical transceiver functions.

More specifically, while the communication module 1 is compatible with the slot 12 of the communication apparatus 11 to which the rated optical transceiver 13 is insertable and removable, the communication module 1 includes many user side input-output ports 3 and a switching circuit (e.g., switch IC 2) for line concentration therein.

The rated optical transceiver 13 has one channel (for a signal transmitted in parallel to one channel logically) of the input-output port at the end of the apparatus side, and one channel of the input-output port at the end of the user side, a main body thereof is covered by a package (e.g., case 5) of the industry standard, and the rated optical transceiver 13 is insertable and removable to the communication apparatus main body 11b.

Briefly, the communication module 1 is "the optical transceiver which is insertable and removable to the slot 12 used by the industry standard optical transceiver 13, and includes many user ports (input-output ports 3) and the switch IC 2".

In the communication module 1, as mentioned above, the communication speed with the communication apparatus main body 11b is about 10-Gbit/s and the interface speed with the external apparatus is about 1-Gbit/s. That is, in the communication module 1, the 1-Gbit/s signal can be transmitted not only to the direction of the 10-Gbit/s port (PHY 14c), but also to the direction of another 1-Gbit/s port by returning in the communication module 1. Thus, the communication module 1 can perform as a 1-Gbit/s Ethernet switch including a 10-Gbit/s uplink port.

Thereby, the communication module 1 has the following advantages.

(1) When the communication apparatus 11 for the 10-Gbit/s port is prepared, it is possible to mix the 10-Gbit/s ports of the communication apparatus main body 11b and the 1-Gbit/s ports of the user side of the communication module 1, and to equip the chosen number of the ports. Consequently, the type and the number of the necessary communication apparatuses can be reduced (if the communication apparatus 11 includes the slot 12 to which the 10-Gbit/s optical transceiver is insertable and removable, the communication apparatus 11 is available for both 10-Gbit/s and 1-Gbit/s)

(2) Only by replacement of the communication module 1, the 10-Gbit/s port and the 1-Gbit/s port can be exchanged.

(3) Since the single communication module 1 includes many 1-Gbit/s ports, the port density of the communication apparatus 11 can be increased.

For example, when a SFP (Small Form-Factor Pluggable) optical transceiver used extensively as a 1-Gbit/s optical port is used, the total number of the ports of the conventional communication apparatus is usually limited to about 24 ports. On the other hand, since the conventional apparatus can accept about eight X2 optical transceivers used extensively as a 10-Gbit/s port, if the communication module 1 according to the present invention is used, then at least 96 (12 times 8) ports are available.

Further, since the optical connector incorporating multiple ports is used as the optical connector 4, and since the optical connector 4 and the optical transmitting-receiving portion 9 are connected by the internal transmitting-receiving taped fiber 10, the communication path between the external apparatus and a patch panel (optical connector) can be connected collectively, and wiring becomes much easy.

Figure 5:
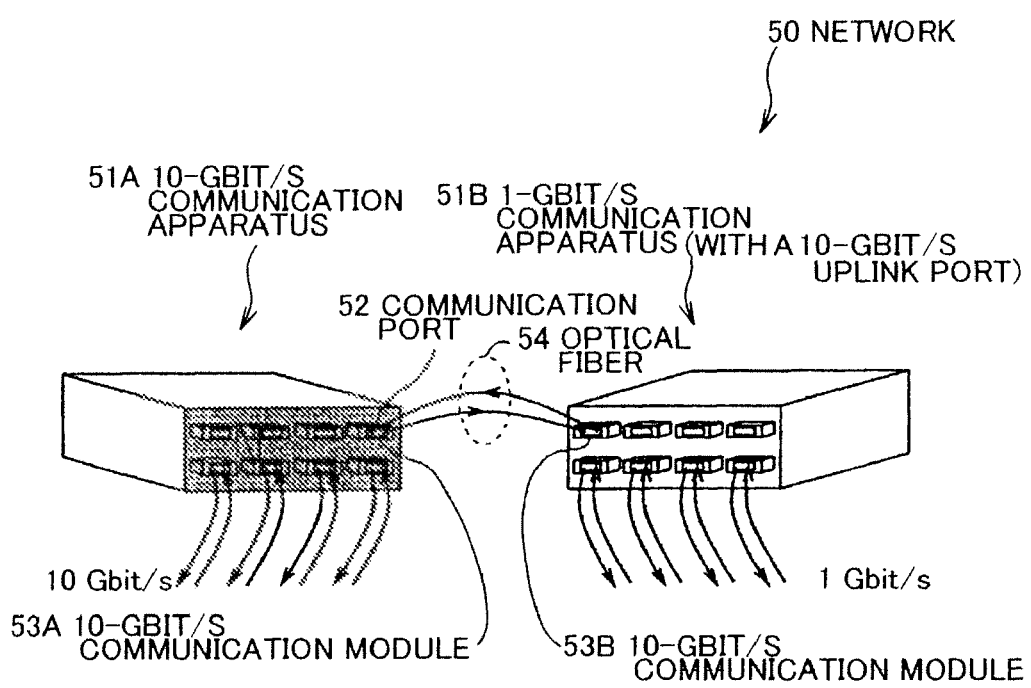
FIG. 5 shows a schematic view of a conventional communication apparatus.

That is, by using the communication apparatus 11 including the communication module 1, two types of communication apparatus 51A and 51B, as shown in FIG. 5, become unnecessary, and the same network as the network 50 can be built by the single communication apparatus 11.

Therefore, the communication module 1 can reduce the type and the number of the communication apparatuses necessary for building of a network, and can reduce the number of futile high-speed and short-distance ports.

With respect to the communication module 1, it is possible that the communication speed with the communication apparatus is about 40-Gbit/s and the interface speed with the external device is about 10-Gbit/s for complying with a next generation standard, and the number of ports is 4 ports.

Further, in this exemplary embodiment, although the optical connector 4 as a connector is used, an electric connector which can connect plural twisted pair cables can be used. The communication module of this case is a transceiver which removes the optical transmitting-receiving portion 9 and the internal transmitting-receiving taped fiber 10 from the communication module 1 shown in FIG. 1.

The effect of the communication module 1 is described more particularly. Concerning the communication module 1, although downsizing and densifying of the communication port are achieved, the advantages of reducing the type and the number of the communication apparatuses necessary for building of a network, and reducing the number of futile (unused) high-speed and short-distance ports is important (even short-distance port is, if 10-Gbit/s port, very expensive).

The 10-Gbit/s port functions by mounting the industry standard transceiver such as XENPAK, X2, and XEP on the slot for 10-Gbit/s port which is disposed in the apparatus and complied with each standard.

Since the transceiver includes the optical component and an ultrahigh-speed electronic circuit, the transceiver is usually expensive. Consequently, sometimes, when the port is an "unused empty port", the transceiver is not mounted, and when needed, the transceiver is purchased and mounted.

In a place, such as a carrier, and an enterprise where lines are concentrated, the number of the 1-Gbit/s ports or 10-Gbit/s ports required by the communication apparatus varies by a network configuration. Thereby, as described in FIG. 5, the network 50 is built by the communication apparatus 51A including many 10-Gbit/s ports and the communication apparatus 51B including one or two 10-Gbit/s uplink ports and tens of 1-Gbit/s ports.

On the other hand, there is a chassis-type communication apparatus used for applying to the various network configuration with flexibility. Various types of line cards in accordance with various transmission speeds and transmission medias (e.g., twisted pair cable, multi-mode fiber, single-mode fiber) are mounted on a chassis, and the network configuration can be optimized.

However, since the chassis is expensive, only a large scale network which is fully mounted by the line cards can reduce a cost. In many cases, a purpose of the chassis type communication apparatus is to equip for an extremely large capacity switching function, and to enhance reliability by sharing or by being redundant with respect to a power source and a cooling fan.

According to the communication module 1 of this exemplary embodiment, a system configuration with extremely high flexibility is achieved merely by the inexpensive and simple box type communication apparatus 11 (a conventional communication apparatus is available). Basically, merely the communication apparatus including a slot for −10 Gbit/s is necessary. Simply by replacing the communication module 1 and the optical transceiver 13, an application for the various 10-Gbit/s ports and 1-Gbit/s ports can be achieved freely.

Further, since a great uselessness of the combination communication apparatuses 51A and 51B shown in FIG. 5 can be avoided, that is, the communication modules 53A and 53B for 10-Gbit/s transmission in short distance can be omitted, a great economical advantage can be obtained.

Still further, since the combination of the communication apparatus main body 11b and the communication module 1 conforms to the unified transceiver standard, the same advantage can be expected in spite of manufacturers of the communication apparatus. Additionally, when applying the communication module 1 for the chassis-type communication apparatus, the flexibility of the chassis-type communication apparatus can be enhanced.

Prior to the invention, there has been no product like the communication module 1 according to this exemplary embodiment since there is a fixed conception that the transceiver is basically "an adopter" (i.e., the transmission speed is not changed) for converting a signal into another signal. Therefore, with respect to improved network efficiency and a reduction of cost, a part of the transceiver and a part of the communication apparatus are considered separately.

However, under the circumstances of increased scale, complexity, and generalization of a network, if the communication apparatus and the transceiver are not considered together, the improvement of the network efficiency has a limitation. According to the present invention, based on considering the combination of the communication apparatus and the transceiver, the advantages mentioned above can be achieved.

However, in commercialization of the communication module 1, some advanced techniques and devices are necessary. Generally, since the transceiver is small, it is difficult to mount the switch IC due to the size (e.g., relatively large) and the power consumption (e.g., relatively large) of the switch IC. Further, in the communication module, a high-density packaging of multi-port interface components of the user side (e.g., an optical transmitter and an optical receiver in the optical transceiver) has been difficult.

With a progress (miniaturization) of semiconductor processing, the size and the power consumption of an IC become less. In addition, the switch IC which has a small size and large amount of power consumption can be mounted on the communication module 1 by some mounting devices. For example, since the recently improved flexible rigid hybrid substrate 7 is used, an internal packaging density can be increased dramatically.

Figure 2:
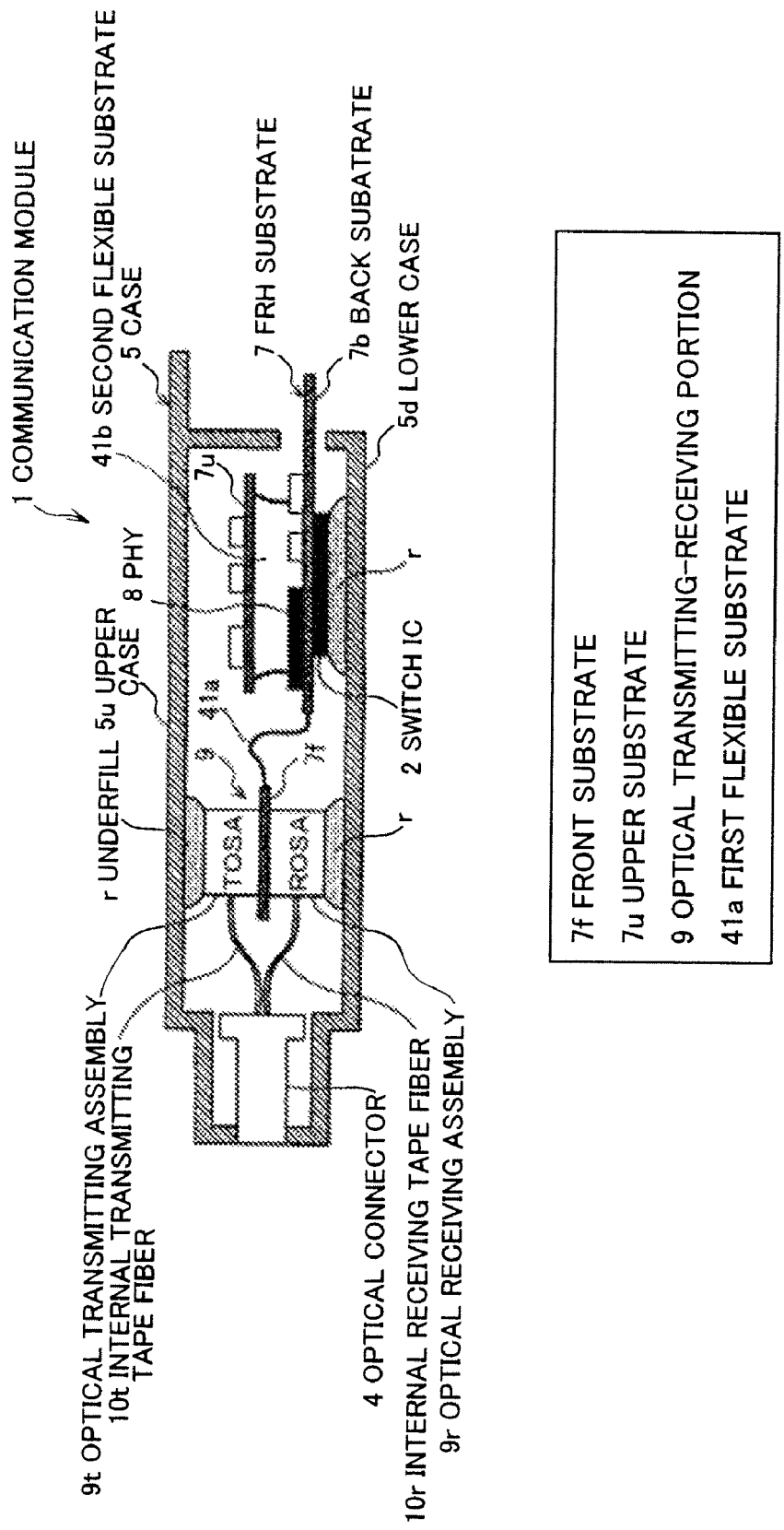
FIG. 2 is a sectional view showing exemplary constitutions of the communication module 1 with a packet switching function of FIG. 1.
Figure 3:
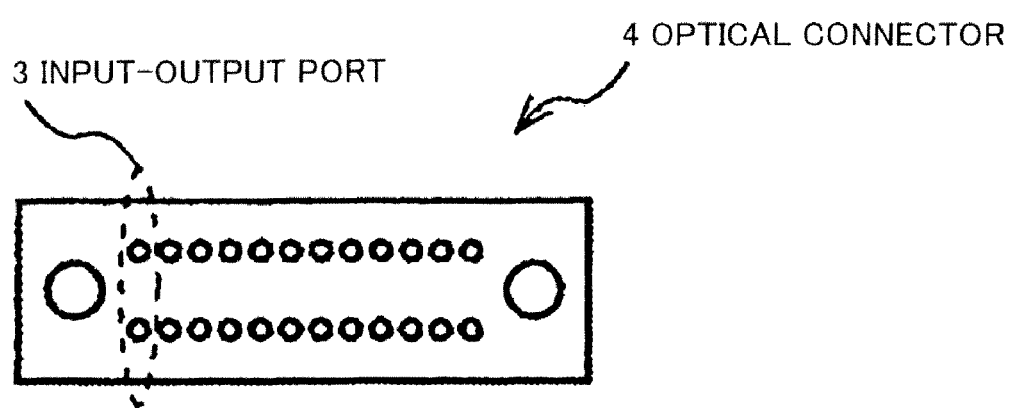
FIG. 3 is a front view showing an optical connector 4 used for the communication module 1 with a packet switching function of FIG. 1.
Figure 4:
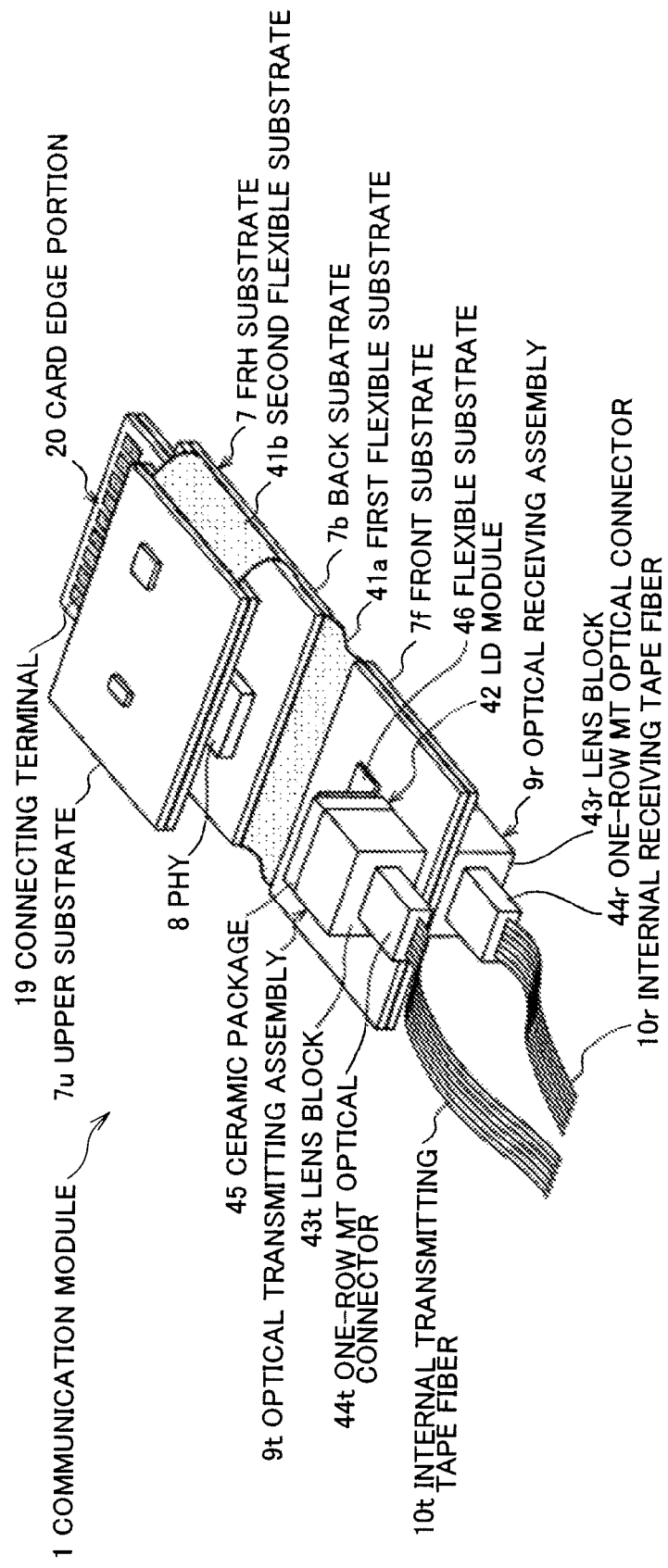
FIG. 4 is a perspective view showing exemplary constitutions of the communication module 1 with a packet switching function of FIG. 1.

The exemplary constitutions of the communication module 1 is described more particularly with reference to FIGS. 2-4.

As shown FIGS. 2-4, the FRH substrate 7 equipped in communication module 1, includes a back substrate 7b of the apparatus side, a front substrate 7f of the connector side, a first flexible substrate 41a for connecting the front and back substrate 7f and 7b, an upper substrate 7u formed above the back substrate 7b, and a second flexible substrate 41b for connecting the upper and back substrate 7u and 7b.

In this exemplary embodiment, the second flexible substrate 41b is curved upwardly from one side of the back substrate 7b.

Further, the PHY 8a is mounted on the one side (surface) of the back substrate 7b, and the switch IC 2 is mounted on the other side (rear surface) of the back substrate 7h. An optical transmitting assembly (TOSA (Transmitter Optical Sub-Assembly)) 9t is mounted on a surface of the front substrate 7f as an optical transmitting portion constituting the optical transmitting-receiving portion 9, and an optical receiving assembly (ROSA (Receiver Optical Sub-Assembly)) 9r mounted on a rear surface of the front substrate 7f as an optical receiving portion constituting the optical transmitting-receiving portion 9. That is, the optical transmitting assembly 9t and the optical receiving assembly 9r are mounted above and below the front substrate 7f so as to sandwich the front substrate 7f.

The optical transmitting assembly 9t is for converting the electric signal from the circuit substrate 7 into the optical signal. The optical receiving assembly 9r is for converting the optical signal from an internal receiving taped fiber 10r into the electric signal.

A gap between the mounted switch IC 2 and a lower case 5d is filled by an underfill r including a heat radiation rubber or a filler as a heat radiating material. Similarly, a gap between the mounted optical transmitting assembly 9t and an upper case 5u, and a gap between the mounted optical receiving assembly 9r and the lower case are also filled by the underfill r including the heat radiation rubber or the filler as the heat radiating material.

The optical transmitting assembly 9t mainly includes an LD (laser diode) module 42 having an LD element as a light-emitting element for respectively converting plural electric signals from the FRH substrate 7 into the optical signals, a lens block 431 having at least one lens for collectively converging the optical signals from the LD element, and a one-row MT optical connector 44t connected to the lens block 43t.

As the LD element, for example, a VSCEL (Vertical-Cavity Surface-Emitting Laser) array in which 12 LD chips are arrayed, may be used. The LD module 42 may be an LD element placed in a ceramic package 45 with hermetic sealing, and having a mounting space of about 1 cm-by-1 cm. The lens block 43t is fixed in front of the ceramic package 45, and plural solder balls are disposed in a grid pattern in a rear of the ceramic package 45. That is, the ceramic package 45 includes a BGA (Ball Grid Array) solder. As a lens for the lens block 43t, for example, a micro lens array may be used.

The one-row MT optical connector 44t (collectively connecting multiple fibers is possible) is connected to the front of lens block 43t of the optical transmitting assembly 9t. An end of an internal transmitting taped fiber 10t for transmitting the optical signal from the optical transmitting assembly 9t is connected to the one-row MT optical connector 44t. The one-row MT optical connector 44t may be formed by plural optical fiber insertion holes formed at a ferrule made of resin in parallel. Each of the insertion holes is for keeping and fixing the one optical fiber as an axis thereof is kept appropriately. The taped fiber may be plural single-core optical fibers (12 optical fibers in FIG. 3) which are arrayed in parallel and are grouped into a tape (referring to FIG. 3).

As shown in FIGS. 2 and 3, a two-row male MPO optical connector, in which the ferrule of the MT connector is used and collectively connects multiple fibers without a tool, is used. The two-row male MPO optical connector is kept and fixed with the case 5.

The two-row male MPO optical connector includes a two-row MP optical connector in which an upper row thereof is connected to the other end of the internal transmitting aped fiber 10t and a lower row thereof is connected to an end of an internal receiving taped fiber 10r, and a nail portion (receptacle portion) for engaging with a two-row female MPO optical connector as an external connector.

The nail portion and a concave portion of a two-row female MPO optical connector constitute a latch mechanism. The transmitting-receiving optical fiber 6 shown in FIG. 1 is connected to the two-row female MPO optical connector. As the transmitting-receiving optical fiber 6, an optical cable can be used. As a relaying transmission path for a previous step thereof, the taped fiber can be used.

The two-row female MPO optical connector is inserted into the nail portion, and the two-row female MPO optical connector and the two-row male MPO optical connector are fitted in the nail portion. Thereby, the internal transmitting taped fiber 10t and a transmitting optical fiber are connected, and the internal receiving taped fiber 10r and a receiving optical fiber are connected.

The optical receiving assembly 9r mainly includes a one-row MT optical connector 44r connected to the other end of the internal receiving taped fiber 10r, and the lens block 43r, which is connected to the one-row MT optical connector 44r, and has at least one lens for collectively converging the plural optical signals from the internal receiving taped fiber 10r, a PD (photo diode) module having plural light-receiving elements (PD element) for respectively converting plural optical signals from the lens block 43r into the electric signals. As the lens for the lens block 43r, for example, the micro lens array may be used.

As the PD element, a PD array in which 12 PD chips are arrayed may be used. The PD module includes the PD element placed in a ceramic package 45 with hermetic sealing. The FRH substrate 7, the optical transmitting assembly 9t, the internal transmitting taped fiber 10t, and the internal receiving taped fiber 10r are, as shown in FIG. 2, placed in the case 5. The case 5 is divided into the lower case 5d having a substantially U-shape transverse section, and the upper case 5u having a substantially U-shape transverse section.

With regard to assembly of the communication module 1, the optical transmitting assembly 9t and the optical receiving assembly 9r are disposed on the front substrate 7f, and assemblies 9t and 9r and the front substrate 7f are electrically connected by a flexible substrate 46.

Meanwhile, the internal transmitting taped fiber 10t, which is connected to the one-row MT optical connector 44t and the upper row of the two-row MT optical connector, and the internal receiving taped fiber 10r, which is connected to the one-row MT optical connector 44r and the lower row of the two-row MT optical connector, are prepared.

The one-row MT optical connector 44t is connected to the lens block 43t of the optical transmitting assembly 9t, and the one-row MT optical connector 44r is connected to the lens block 43r of the optical receiving assembly 9r.

The two-row male MPO optical connector is formed by attaching the nail portion to the two-row MT optical connector. Then, the FRH substrate 7 is placed in the lower case 5*d*, and finally, by threading the upper case 5*u* onto the lower case 5*d*, the communication module 1 is completed.

As described above, since the communication module 1 is formed by the FRH substrate 7 on which the optical components and the electric components are mounted, a mounting location is free in three dimensions, and a heat coupling with a transceiver package is achieved easily (since the power consumption of the 10-Gbit/s transceiver is large, the package preferably is made of metal). Since a microstrip line is easily formed by making a conductor of a flexible part multilayer, an internal transmission line for a high speed signal can be formed with high density and high reliability, while keeping flexibility of mounting.

Especially, the switch IC 2 and the optical transmitting assembly 9*t* which generate a large amount of heat are placed in the case 5 through the underfill r, the communication module 1 can perform good heat radiation regardless of its multiple functions. Therefore, since the communication module 1, when operating, can suppress an increasing of temperature, the communication module 1 is highly reliable.

Further, since the switch IC 2 is mounted inside of the transceiver, the transmission path (transmission line) between the switch IC 2 and the PHY 8*a*, and between the PHY 8*a* and the optical transmitting-receiving portion 9 is shortened, and a circuit modification for saving power consumption with regard to exchanging signals in these portions can be made.

For example, although the signals of 1-Gbit/s class usually use a characteristic impedance of 50Ω, it is possible to use the characteristic impedance of 100Ω by shortening the transmission path. When the circuit complies with the characteristic impedance of 100Ω, the current consumption can be reduced to one-half. Therefore, when the voltage is kept constant, the power consumption can be reduced to one-half.

Further, when the transmission path is short, since a degradation of the signal is small, a voltage amplitude can be less, and the power consumption can be reduced more.

Still further, when the communication module 1 is constituted as shown in FIGS. 2-4, multichannel high-speed optical transmitting and receiving (e.g., more than several Gbit/s class by 10 channels) can be achieved in a single transceiver package.

That is, in the communication module 1 described in FIGS. 2-4, the user side optical connector 4 forms the two upper and lower rows such as 12 channels by 2 rows, and the communication module 1 can be downsized by the device.

Further, the optical transmitting assembly 9*t* and the optical receiving assembly 9*r* separated by transmission and reception are used, and these assemblies 9*t* and 9*r* and the optical connector 4 constitute a pigtail structure with the taped fiber. Additionally, the optical transmitting assembly 9*t* and the optical receiving assembly 9*r* are mounted on the surface and the rear surface of the front substrate 7*f* separately.

Thereby, since the communication signal for transmission is transmitted on the surface of the front substrate 7*f* and the communication signal for reception is transmitted on the rear surface of the front substrate 7*f*, an electrical crosstalk by transmission and reception can be decreased.

Exemplarily, a ground layer for electrically shielding between the transmitting communication signal, which transmits on the surface of the front substrate 7*f*, and the receiving communication signal, which transmits on the rear surface of the front substrate 7*f*, is formed inside of the front substrate 7*f*.

The electrical crosstalk in transmission and reception can be decreased effectively by the ground layer.

As described above, the communication module 1 of the exemplary embodiment incorporating the switch circuit can be obtained by the combination of the structure, the circuit, and the various devices of the optical transmitting-receiving portion.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. A communication module mounted on a communication apparatus, said communication apparatus comprising:
   a communication apparatus main body comprising:
      a plurality of slots, the communication module being insertable into or removable from the slots;
      a plurality of apparatus side signal processing circuits for processing a communication signal which is transmitted to or received from said communication module at a predetermined communication speed; and
      a switch LSI for changing a destination of the communication signal,
   wherein said communication module comprises:
      a switching portion for performing at least one of dividing the communication signal transmitted or received at a communication speed of said communication module, and combining the communication signals transmitted or received at a communication speed of an external apparatus;
      a connector comprising a plurality of input-output ports, each of said plurality of said input-output ports being connected to said external apparatus respectively; and
      a plurality of connecting terminals being connected to said communication apparatus main body when said communication module is inserted into said slots,
      wherein said switching portion is connected to said connector and said connecting terminals; and
      a circuit substrate on which said switching portion is mounted,
   wherein the plurality of connecting terminals are formed on said circuit substrate for connecting to said communication apparatus, and
   wherein said communication module is pluggable with said communication apparatus.

2. A communication module according to claim 1, further comprising:
   an optical transmitting-receiving portion comprising a photoelectric conversion function; and
   a module side signal processing circuit for processing the communication signal between said switching portion and said optical transmitting-receiving portion,
   wherein said circuit substrate comprises a flexible rigid hybrid substrate on which said switching portion, said optical transmitting-receiving portion, and said module side signal processing circuit are mounted.

3. A communication module according to claim 2, wherein said flexible rigid hybrid substrate comprises a front substrate disposed in a connector side, a back substrate disposed in a communication apparatus side, a first flexible substrate for connecting said front and back substrates, an upper substrate disposed above said back substrate, and a second flexible substrate for connecting said upper and back substrates.

4. A communication module according to claim 3, wherein said module side signal processing circuit is mounted on a surface of said back substrate,
 wherein said switching portion is mounted on another surface of said back substrate, and
 wherein said optical transmitting-receiving portion is mounted on said front substrate.

5. A communication module according to claim 3, wherein said optical transmitting-receiving portion comprises an optical transmitting portion and an optical receiving portion which are mounted above and below said front substrate so as to sandwich said front substrate,
 wherein said connector comprises an optical connector for collectively connecting a plurality of internal transmitting-receiving taped fibers,
 wherein said optical connector and said optical transmitting portion are connected by an optical transmitting taped fiber, and
 wherein said optical connector and said optical receiving portion are connected by an optical receiving taped fiber.

6. A communication module according to claim 3, further comprising:
 a ground layer formed inside of said front substrate, said ground layer for electrically shielding between a transmitting communication signal which transmits on a surface of said front substrate and a receiving communication signal which transmits on a rear surface of said front substrate.

7. A communication module mounted on a communication apparatus, said communication apparatus comprising:
 a communication apparatus main body comprising:
  a plurality of slots, the communication module being insertable into or removable from the slots;
  a plurality of apparatus side signal processing circuits for processing a communication signal which is transmitted to or received from said communication module at a predetermined communication speed; and
  a switch LSI for changing a destination of the communication signal,
 wherein said communication module comprises:
  a switching portion for performing at least one of dividing the communication signal transmitted or received at a communication speed of said communication module, and combining the communication signals transmitted or received at a communication speed of an external apparatus;
  a connector comprising a plurality of input-output ports, each of said plurality of said input-output ports being connected to said external apparatus respectively; and
  a plurality of connecting terminals being connected to said communication apparatus main body when said communication module is inserted into said slots,
 wherein said switching portion is connected to said connector and said connecting terminals,
 wherein the communication speed with the communication apparatus main body is about 10-Gbit/s,
 wherein an interface speed with the external apparatus is about 1-Gbit/s, and
 wherein said ports comprise 10~24 ports.

8. A communication module mounted on a communication apparatus, said communication apparatus comprising:
 a communication apparatus main body comprising:
  a plurality of slots, the communication module being insertable into or removable from the slots;
  a plurality of apparatus side signal processing circuits for processing a communication signal which is transmitted to or received from said communication module at a predetermined communication speed; and
  a switch LSI for changing a destination of the communication signal,
 wherein said communication module comprises:
  a switching portion for performing at least one of dividing the communication signal transmitted or received at a communication speed of said communication module, and combining the communication signals transmitted or received at a communication speed of an external apparatus;
  a connector comprising a plurality of input-output ports, each of said plurality of said input-output ports being connected to said external apparatus respectively; and
  a plurality of connecting terminals being connected to said communication apparatus main body when said communication module is inserted into said slots,
 wherein said switching portion is connected to said connector and said connecting terminals,
 wherein the communication speed with the communication apparatus main body is about 40-Gbit/s,
 wherein an interface speed with the external apparatus is about 10-Gbit/s, and
 wherein said ports comprise 4 ports.

9. A communication module mounted on a communication apparatus, said communication apparatus comprising:
 a communication apparatus main body comprising:
  a plurality of slots, the communication module being insertable into or removable from the slots;
  a plurality of apparatus side signal processing circuits for processing a communication signal which is transmitted to or received from said communication module at a predetermined communication speed; and
  a switch LSI for changing a destination of the communication signal,
 wherein said communication module comprises:
  a switching portion for performing at least one of dividing the communication signal transmitted or received at a communication speed of said communication module, and combining the communication signals transmitted or received at a communication speed of an external apparatus;
  a connector comprising a plurality of input-output ports, each of said plurality of said input-output ports being connected to said external apparatus respectively; and
  a plurality of connecting terminals being connected to said communication apparatus main body when said communication module is inserted into said slots,
 wherein said switching portion is connected to said connector and said connecting terminals, and
 wherein said connector comprises an electric connector for connecting a plurality of twisted pair cables.

* * * * *